UNITED STATES PATENT OFFICE.

WILHELM BAUER, OF VOHWINKEL, AND ALFRED HERRE AND RUDOLF MAYER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VAT DYE.

985,767. Specification of Letters Patent. Patented Mar. 7, 1911.

No Drawing. Application filed June 18, 1910. Serial No. 567,688.

*To all whom it may concern:*

Be it known that we, WILHELM BAUER, residing at Vohwinkel, and ALFRED HERRE and RUDOLF MAYER, residing at Elberfeld, Germany, citizens of the German Empire, have invented useful Improvements in New Vat Dye, of which the following is a specification.

Our invention relates to the manufacture and production of new and valuable vat dyestuffs. They are obtained by condensing monohalogenated beta-naphthisatin derivatives in which the oxygen of the alpha-keto group is replaced by easily movable or replaceable substituents, e. g. halogen, sulfur, the amino group, the alkoxy group with phenolic compounds, especially 1-anthrol, 1-naphthol, 1.5- and 1.8-dioxyanthracenes and their substituted derivatives having a free ortho position to the hydroxy group.

The new dyes are in a dry state dark blue crystalline powders with a metallic luster which are soluble in hot nitrobenzene generally with a blue coloration, and which yield with hydrosulfite and caustic soda lye generally orange vats dyeing cotton after exposure to air blue-gray to black shades remarkable for their fastness to chlorin.

In order to illustrate the new process more fully we can proceed as follows, the parts being by weight:—69. parts of bromo-beta-naphthisatin are converted into the alpha-chlorid by heating them with 55 parts of PCl$_5$ and 500 parts of dry chlorobenzene. The mixture thus obtained is then added to a warm solution, which is well-stirred, of 50 parts of 1-anthrol in 600 parts of dry chlorobenzene; stirring is continued for some time while it is hot. After cooling the dye is filtered off and washed with benzene and ether. It is a dark blue powder difficultly soluble in cold concentrated sulfuric acid with an olive-brown and in monohydrated sulfuric acid with a greenish-blue color, scarcely soluble in hot benzene with a greenish-blue color. It forms an orange vat with hydrosulfite and caustic alkali, from which cotton is dyed after exposure to air in fast gray to black shades. Chloro-beta-naphthisatin furnishes a similar product.

We claim:—

1. The herein described new dyestuffs obtainable from a mono-halogenated beta-naphthisatin derivative in which the oxygen of the alpha-keto group is replaced by easily movable or replaceable substituents and a phenolic compound, which dyestuffs are in a dry state dark blue crystalline powders with a metallic luster which are soluble in hot nitrobenzene generally with a blue coloration, and which yield with hydrosulfite and caustic soda lye vats dyeing cotton after exposure to air from gray to black shades remarkable for their fastness to chlorin, substantially as described.

2. The herein described new dyestuffs obtainable from bromo-beta-naphthisatin-alpha-chlorid and 1-anthrol, which dyestuff is in a dry state dark blue powder, soluble in concentrated sulfuric acid with an olive-brown color, and which yields with hydrosulfite and caustic soda lye an orange vat from which cotton is dyed a gray to black remarkable for its fastness to chlorin, substantially as described.

In testimony whereof we have hereunto set our hands in the presence of two subscribing witnesses.

WILHELM BAUER. [L. S.]
ALFRED HERRE. [L. S.]
RUDOLF MAYER. [L. S.]

Witnesses:
OTTO KÖNIG,
CHAS. J. WRIGHT.